Figure 1:
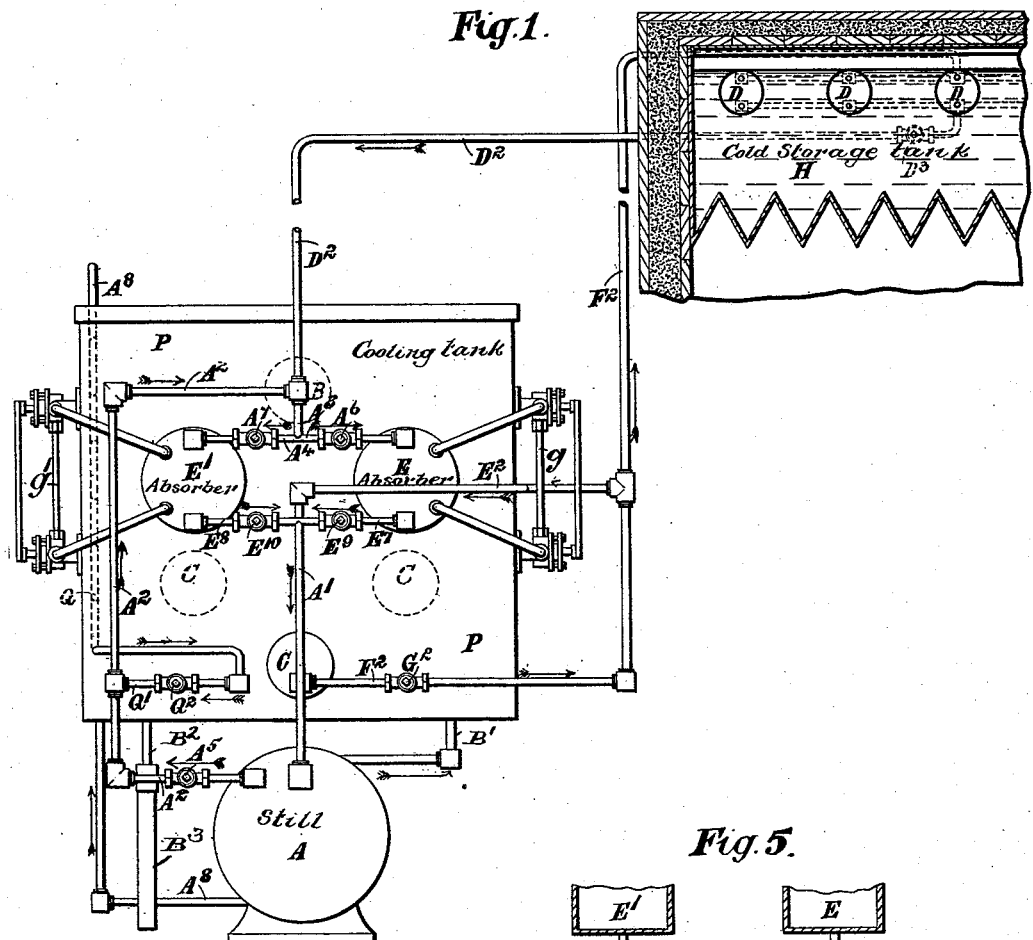

(No Model.) 5 Sheets—Sheet 1.
F. B. HILL.
REFRIGERATING MACHINE.

No. 524,249. Patented Aug. 7, 1894.

Witnesses:—
J. A. Rutherford
Robert Everett

Inventor:
Frederick Barker Hill
By James L. Norris
Attorney (No Model.)  5 Sheets—Sheet 2.

F. B. HILL.
REFRIGERATING MACHINE.

No. 524,249.  Patented Aug. 7, 1894.

Witnesses:
J. A. Rutherford
Robert Emmett

Inventor:
Frederick Barker Hill
By James L. Norris
Attorney (No Model.) 5 Sheets—Sheet 3.

F. B. HILL.
REFRIGERATING MACHINE.

No. 524,249. Patented Aug. 7, 1894.

(No Model.)  5 Sheets—Sheet 4.

F. B. HILL.
REFIGERATING MACHINE.

No. 524,249.  Patented Aug. 7, 1894.

(No Model.)
5 Sheets—Sheet 5.

F. B. HILL.
REFRIGERATING MACHINE.

No. 524,249. Patented Aug. 7, 1894.

UNITED STATES PATENT OFFICE.

FREDERICK BARKER HILL, OF LONDON, ENGLAND, ASSIGNOR TO THE HILLS COLD STORAGE COMPANY, LIMITED, OF SAME PLACE.

REFRIGERATING-MACHINE.

SPECIFICATION forming part of Letters Patent No. 524,249, dated August 7, 1894.

Application filed June 9, 1892. Serial No. 436,162. (No model.) Patented in England October 15, 1889, No. 16,253.

*To all whom it may concern:*

Be it known that I, FREDERICK BARKER HILL, engineer, a subject of the Queen of Great Britain, and a resident of London, England, have invented new and useful Improvements in Refrigerating and Ice-Making Machines, (for which I have obtained a patent in Great Britain, No. 16,253, bearing date October 15, 1889,) of which the following is a specification, reference being had to the accompanying drawings.

My invention relates to refrigerating and ice-making machines and comprises various improvements hereinafter described.

My said invention is chiefly designed to improve the construction of apparatus for refrigeration or for the production of ice by the intermittent ammonia absorption process. My improvements are, however, partly applicable to apparatus for the production of cold by other processes.

One important feature of my said invention is the provision of suitable means whereby I am enabled to rapidly reduce the pressure in the ammonia-boiler after the liquid ammonia has been distilled and collected in the refrigerator, and to effect the absorption of the ammoniacal gas from the refrigerator much earlier after the distillation than has heretofore been practicable.

In the use of intermittent ammonia absorption refrigerating and ice-making machines as heretofore constructed, it is necessary, after the distillation of the ammonia, to reduce the temperature of the liquid in the boiler until the pressure is sufficiently diminished to permit the vaporization of the liquid ammonia in the refrigerator, and until the liquid in the boiler is sufficiently cool to permit the absorption of the ammoniacal gas thereby. This cooling of the said liquid necessarily occupies a considerable space of time. Moreover, in many of the refrigerating and ice-making machines heretofore used, the absorption of the ammoniacal gas takes place only at the surface of the liquid in the boiler, and is necessarily a slow process, the liquid being of higher temperature at the surface than at any other part thereof, and having its temperature raised at the surface by the condensation of the gas. Now I have discovered that, by employing one or more separate or auxiliary absorbers which can be put in communication with the boiler, the cooler or condenser and the refrigerator as required, and in which the ammoniacal gas can ascend through a body of liquid, I can very rapidly diminish the pressure in the ammonia boiler by absorbing the gas from the boiler, the rectifier and the condenser in the said absorber or absorbers; moreover I am enabled to effect the absorption of the ammoniacal gas from the refrigerator either in the supplementary or auxiliary absorber or absorbers, or in the boiler, immediately or very soon after the distillation, thus greatly expediting the production of cold by the machine. I find it advantageous, for this purpose, to combine, with the ammonia boiler, two separate absorbers so arranged that they can be used alternately, that is to say, after the distillation of the ammonia and its collection in the refrigerating tubes or chambers, the ammoniacal gas from the refrigerating tubes or chambers is absorbed in the liquid contained in one of the said absorbers; the impoverished solution from the boiler is then forced by the pressure therein into the other absorber, which is then used for absorbing further quantities of the gas, while the ammonia solution from the first absorber is allowed to return to the boiler and is again distilled, and so on. I thus obviate the necessity for cooling the boiler for the purpose of using it as an absorber.

My said invention, moreover, comprises other improvements hereinafter set forth.

In the accompanying drawings I have shown how my said invention may be conveniently and advantageously carried into practice.

Figure 5:
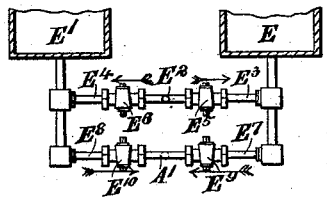
Figure 4:
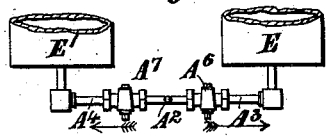
Figure 3:
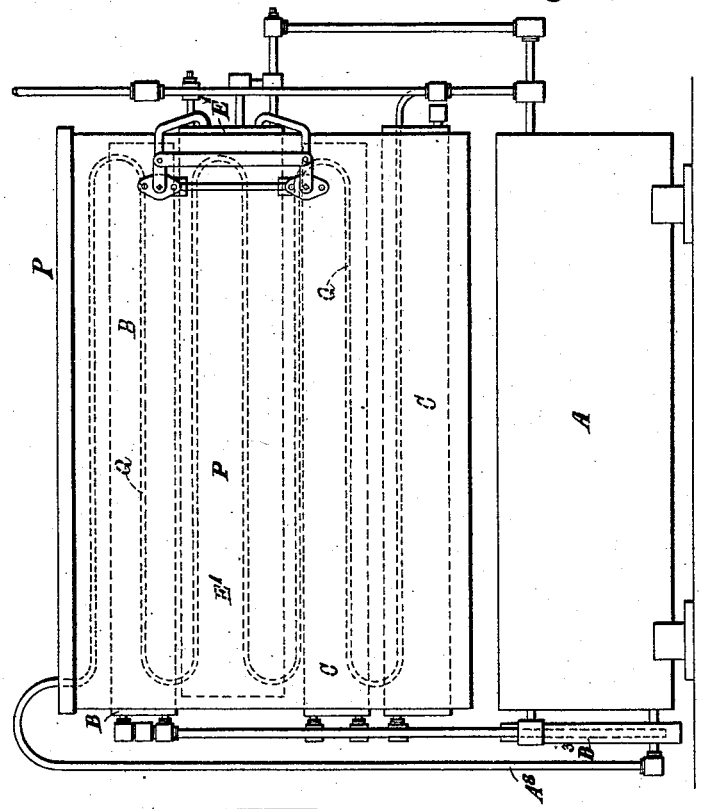
Figure 2:
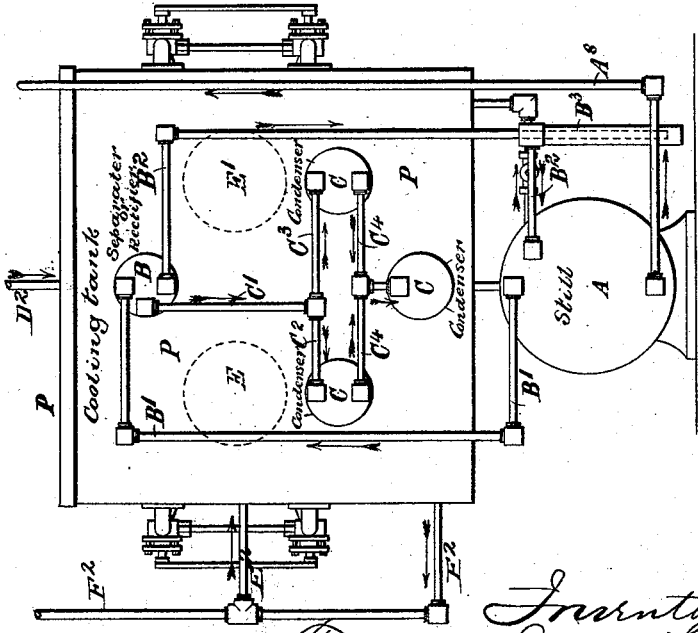
Figure 6:
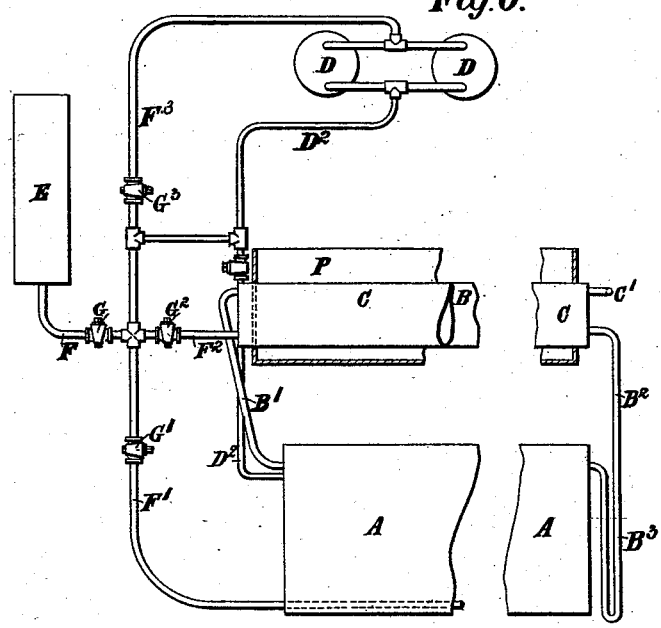
Figure 8:
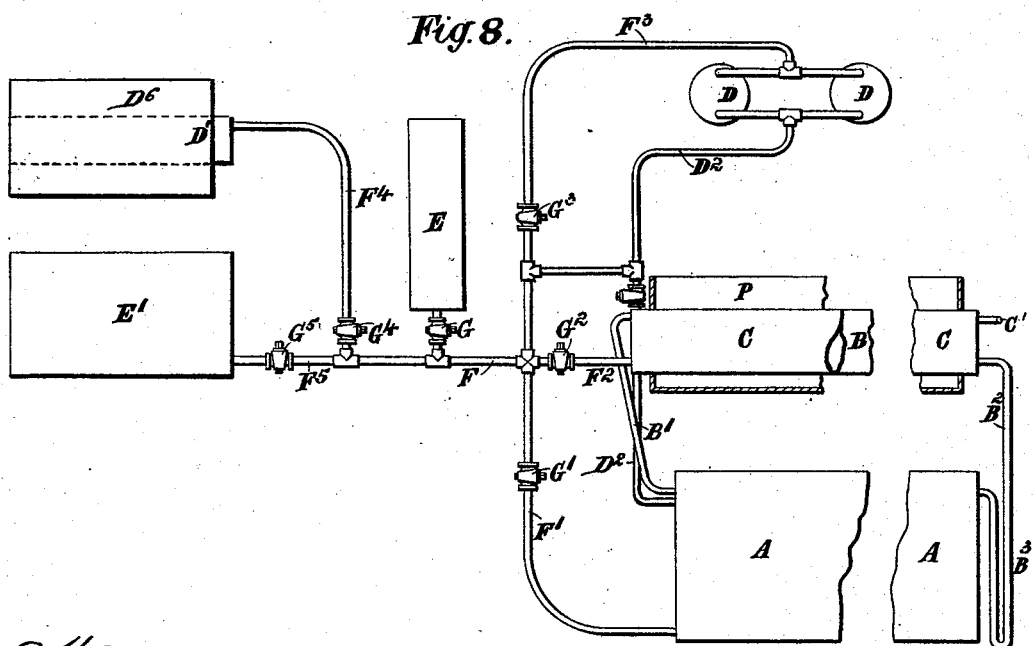
Figure 9:
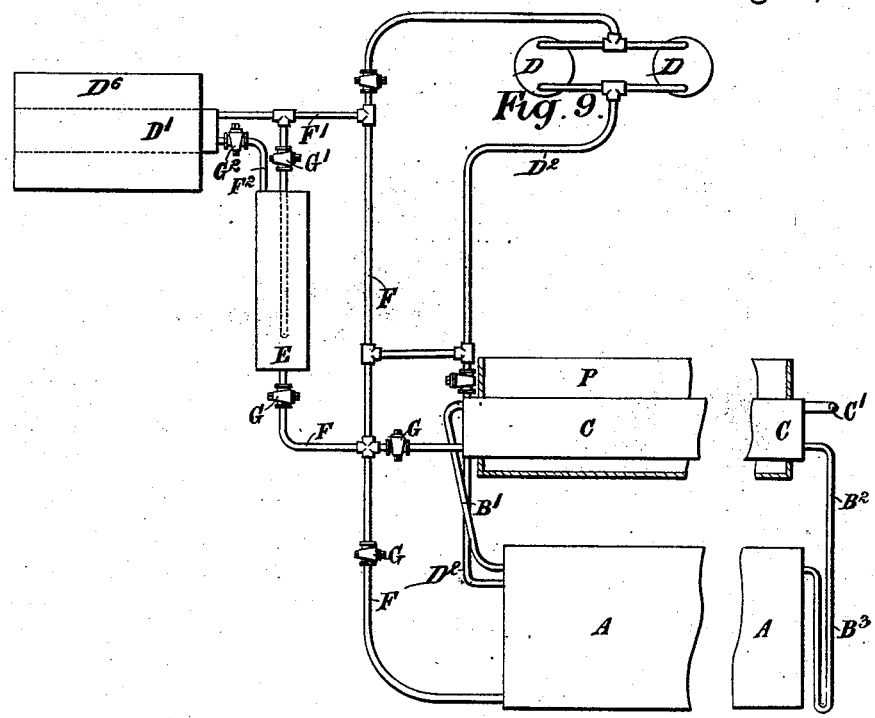
Figure 10:
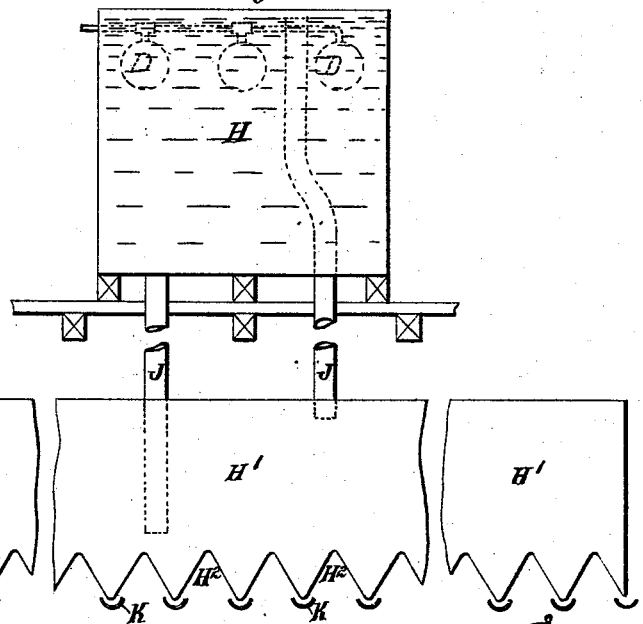
Figure 11:
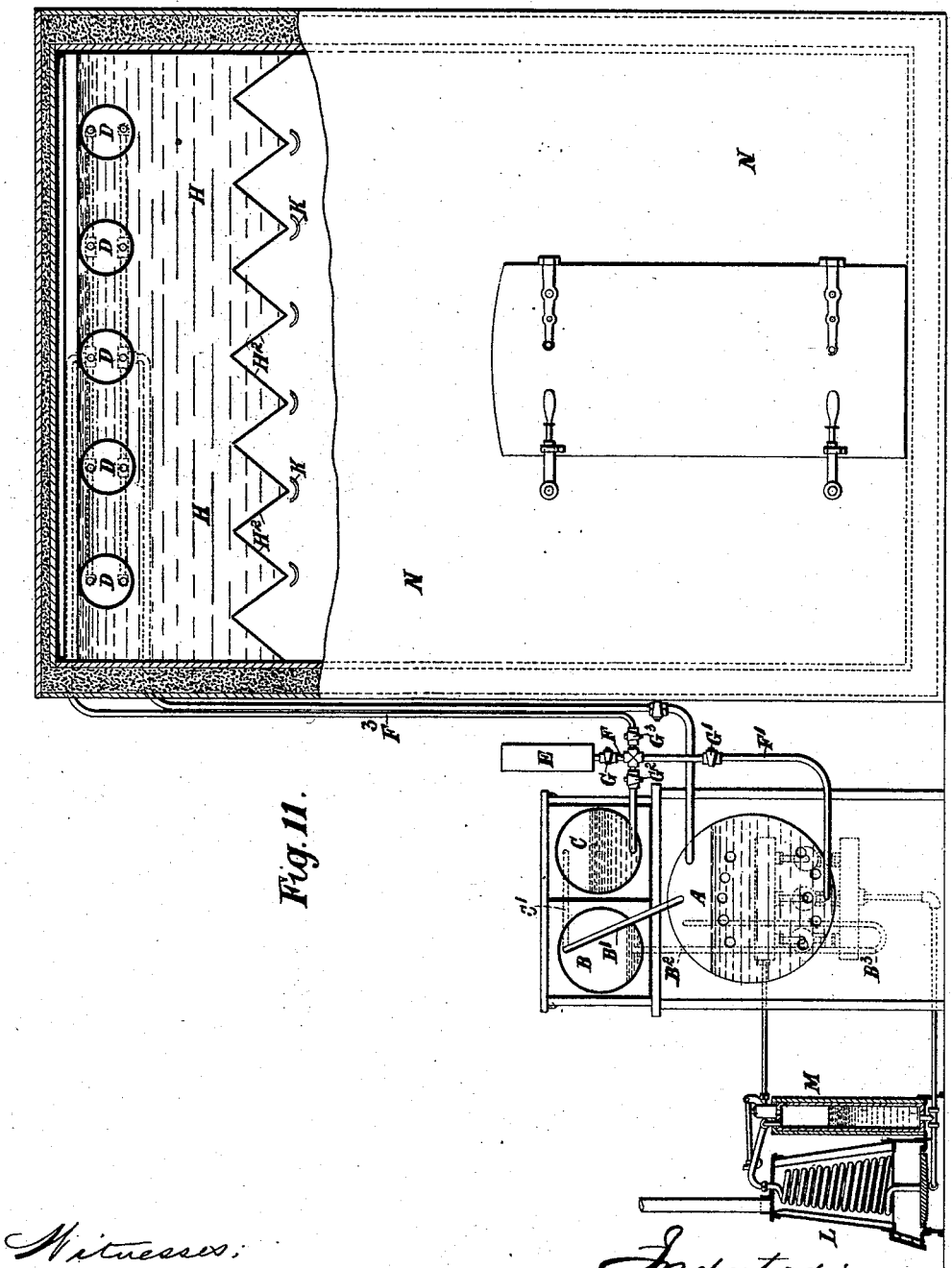

Figure 1 is a front elevation, partly in vertical section; Fig. 2 a rear elevation, and Fig. 3 a side elevation of one form of my improved apparatus. Fig. 4 is a plan or top view of a portion of the absorbers, and Fig. 5 is a horizontal section of the same portion of the said absorbers. Fig. 6 is a front elevation, partly in vertical section, and Fig. 7 an end elevation, illustrating a refrigerating apparatus provided with a single supplementary or auxiliary absorber according to my said invention. Figs. 8 and 9 are front elevations, partly in vertical section, illustrating modifications of my said invention hereinafter described. Fig. 10 is a front elevation, partly in vertical section, showing a tank for containing brine or other non-congealable liquid in which the refrigerator tubes are immersed, and a cooling tank so combined therewith that a circulation of the non-congealable liquid will be maintained by gravity, and the refrigerating apparatus can be placed on a floor above the said cooling tank; and Fig. 11 is a front elevation, partly in vertical section, showing a complete cold storage apparatus constructed according to my present improvements.

Like letters indicate corresponding parts throughout the drawings.

A is the ammonia-boiler.
B is the separator or rectifier.
C is the cooler or condenser.
D is the refrigerator.

Referring to Figs. 1 to 5, E, E' are two absorbers. These absorbers together with the separator or rectifier B and the three condensers or liquefiers C are immersed in water in a tank P, through which water is circulated for the purpose of cooling the said absorbers, the separator or rectifier and the condensers.

The ammoniacal gas from the boiler A is conducted through a pipe B' to the separator or rectifier B. The water from this separator returns to the boiler by gravity through a pipe $B^2$ provided with a trap $B^3$. The ammoniacal gas from the separator or rectifier B is conducted through a pipe C' and branch-pipes $C^2$, $C^3$ to the two uppermost condensers C, which are connected with the lower condenser C by pipes $C^4$. The anhydrous liquid ammonia is forced from the lower condenser C into the refrigerating tubes or chambers D through a pipe $F^2$ provided with a cock $G^2$.

The tubes or chambers D are preferably inclosed in a cold-storage tank H the bottom of which forms the ceiling of a room or chamber to be cooled.

The pipe $F^2$ is connected with the absorbers E E' by a pipe $E^2$ and branch-pipes $E^3$, $E^4$, the latter being provided with cocks $E^5$, $E^6$ respectively, so that, by closing the cock $G^2$ and opening the cock $E^5$ or $E^6$, the ammoniacal gas may be allowed to pass from the refrigerating tubes or chambers D into the absorber E or E' as may be desired.

The absorbers E, E' are provided with gage-glasses $g$, $g'$ respectively, so that the level of the liquid therein may be ascertained at any time. The said absorbers are connected respectively with the boiler A by means of pipes $E^7$, $E^8$, provided with cocks $E^9$, $E^{10}$, and connected with a pipe A' communicating with the said boiler, so that the strong ammoniacal solution from either of the absorbers may be allowed to flow by gravity into the boiler when necessary. To provide for equalizing the pressure in the boiler and absorber for this purpose, the absorbers are also connected with the upper part of the boiler A by means of a pipe $A^2$ and branch-pipes $A^3$, $A^4$, the pipe $A^2$ being provided with a cock $A^5$, and the pipes $A^3$, $A^4$ with cocks $A^6$, $A^7$.

To provide for the return by gravity to one or other of the absorbers, of any impoverished solution that may accumulate in the refrigerating-tubes or chambers D, these tubes or chambers are connected with the pipe $A^2$ by means of a pipe $D^2$ provided with a cock $D^3$.

The lower part of the boiler A is connected by a pipe $A^8$ with a cooling coil Q arranged within the tank P. This coil is connected with the pipe $A^2$ by means of a pipe Q' provided with a cock $Q^2$.

The operation of this apparatus is as follows, viz:—The boiler A and the absorber E' being properly charged with ammoniacal liquor, the said boiler is heated by means of steam or in any other convenient manner. The ammoniacal gas rises through the pipe B' to the separator or rectifier B in which any steam that may be carried up with the gas is condensed and separated from the gas, the water of condensation returning to the boiler through the pipe $B^2$ and siphon $B^3$. The gas flows from the separator B through the pipes C', $C^2$, $C^3$, $C^4$, into the condensers or liquefiers C. The cock $G^2$ being opened, the liquefied ammonia from the lowermost condenser C is forced up through the pipe $F^2$ into the tubes or chambers D. The cocks $Q^2$, $A^6$, are then opened to allow some of the impoverished solution from the boiler A to flow into the absorber E, this liquid being cooled in its passage through the coil Q. When the temperature of the tubes or chambers D is to be reduced, the cock $G^2$ is closed and the cock $E^5$ is opened so that the ammoniacal gas from the tubes or chambers D may enter the absorber E and be absorbed by the weak solution therein. When the liquid in this absorber is saturated and can absorb no more gas, the cock $E^5$ is closed and the cock $E^6$ opened. While the gas is being absorbed in the absorber E', the ammonia solution from the absorber E is allowed to return to the boiler A, the cocks $A^5$, $A^6$, and $E^9$ being opened for this purpose, the cock $Q^2$ being previously closed. The distillation of the ammonia can then be continued, the operations above described being carried on alternately with the absorbers E E'. It is evident that, with this arrangement, a large quantity of liquid ammonia can be collected in the tubes or chambers D and vaporized from time to time as required, without the necessity for cooling the boiler A to permit its use as an absorber, and the process is rendered continuous. Moreover, the action of the apparatus can be very easily and effectively regulated or controlled.

I sometimes provide the apparatus with an equalizer or temperature exchanger of any suitable description, whereby the impoverished solution in passing from the boiler A to one of the absorbers, may impart some of its heat to the ammonia solution as it flows from the other absorber to the boiler.

Figure 7:
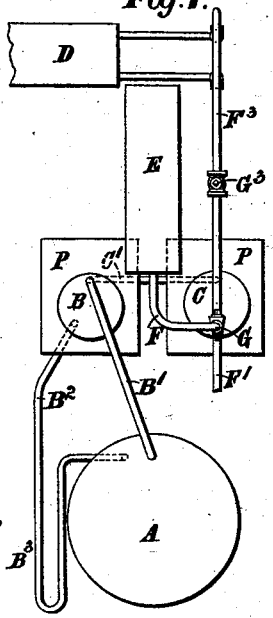

Referring to Figs. 6 and 7, E is a supplementary or auxiliary absorber connected with the boiler A, the condenser C and refrigerator D by pipes F, F', F$^2$, F$^3$, provided with suitable cocks or valves G, G', G$^2$, G$^3$. In this case, that is to say, where only one absorber is used, only the boiler or still is charged with ammonia solution at starting. By manipulating these cocks as required, impoverished ammoniacal liquor from the said boiler may be introduced into the absorber E after the distillation of the ammonia, and the liquid charged with the gas by absorption as hereinafter specified may be caused to return from the said absorber to the boiler by gravity. For example, when the liquid anhydrous ammonia has been collected in the refrigerator D, the cocks G$^2$, G$^3$ are closed and the cocks G, G' are partly opened, thus allowing a portion of the weak or impoverished solution from the boiler A, to be forced into the absorber E; the cock G' is then closed, and the cock G$^2$ is opened to rapidly relieve the pressure in the condenser, rectifier and boiler by allowing any gas that may remain in the condenser, rectifier and boiler to be absorbed by the weak solution in the absorber E.

When the solution in the boiler is cooled sufficiently to permit re-absorption of the gas thereby, the boiler is put in communication with the refrigerator by opening the cocks G', G$^3$. The ammonia solution from the absorber E will be returned by gravity or otherwise into the ammonia boiler A through the cocks G, G' when required.

The pipe D$^2$ permits the return by gravity, either to the boiler or to the absorber, as may be desired, of any impoverished solution that may accumulate in the refrigerating tubes or chambers D.

If desired, I can put the refrigerator D in communication with the supplementary or auxiliary absorber E instead of with the boiler A, and thus permit the vaporization of liquid ammonia in the refrigerator and the absorption of the ammoniacal gas by the impoverished ammoniacal liquor previously introduced into the said absorber E from the ammonia boiler. While the vaporization of the ammonia in the refrigerator is thus proceeding, the weak solution in the ammonia-boiler may be cooled, after which the refrigerator may be put in communication with the said boiler.

I sometimes combine one or more supplementary or auxiliary absorbers with two or more sets of apparatus for the production of cold, that is to say, with two or more sets of refrigerating apparatus or of ice-making apparatus, or with both refrigerating and ice-making apparatus.

In Fig. 8, I have illustrated the combination of an ice-making apparatus comprising a refrigerator D', with an apparatus constructed as above mentioned for cooling a room or chamber, and with one or more supplementary or auxiliary absorbers E, E'. The refrigerating chamber D' is arranged in a brine-tank D$^6$ from which the brine is circulated around the boxes or receptacles in which the ice is to be produced. The auxiliary absorber E' is connected with the refrigerator D' and with the cooling apparatus by pipes F$^4$, F$^5$ provided with stop cocks or valves G$^4$, G$^5$, so that the absorbers E, E' can be used either with the cooling apparatus or with the ice-making apparatus. For instance both absorbers E E' can be charged with impoverished liquor from the boiler A, and then some of the gas from the refrigerators D or from the refrigerator D' can be absorbed in the liquor contained in one of the absorbers and the remainder in the liquor contained in the other absorber.

Fig. 9 illustrates another modification of my invention wherein a single auxiliary absorber E is used in combination with a cooling apparatus and an ice-making apparatus. In this arrangement D, D are refrigerators for cooling a room or chamber; D' is a refrigerator arranged in a brine tank D$^6$, from which the brine is circulated around suitable ice boxes or pans. The absorber E can be used as above described for absorbing gas either from the refrigerators D, D, or from the refrigerator D'. I can thus provide apparatus whereby the cooling of rooms or chambers and the making of ice can be very effectually performed either separately or simultaneously. I can, if desired, make suitable provision for effecting the return of the liquor from the absorber or absorbers to the boiler by the pressure from the refrigerator or in any other convenient manner.

In Fig. 10, I have shown an arrangement which I prefer to employ when it is desired to arrange the refrigerating apparatus on a floor above the cooling chamber. This arrangement, moreover, permits the circulation of the cooling medium by gravity, so that I can dispense with pumps or other machinery for effecting such circulation. H is the refrigerator-tank; H' is another tank or vessel which is preferably arranged at a lower level than the refrigerator-tank, and is connected therewith by means of pipes J in such a manner that a constant circulation of the brine or other non-congealable liquid from one tank to the other will be maintained by gravity during the refrigeration of the liquid. It will be seen that, by the use of tanks connected in this manner, I can greatly enlarge the reservoir or store of cold. The bottom of the cooling tank H' may if desired serve as the top of the chamber to be cooled.

I prefer to make the bottom of the tank H' with a series of V-shaped portions or corrugations H$^2$ and to arrange suitable gutters or channels K beneath the said tank, so that any moisture collecting on the under side of the said tank will flow to the lower edges of the corrugations or V-shaped portions and will fall into the said gutters or channels, whereby it will be conducted away to any convenient place. I thus provide for preventing the dripping of moisture from the under surface of the tank into the room or chamber to be cooled. This arrangement also increases the area of cooling surface and the strength of the bottom of the tank.

In Fig. 11 I have shown an entire cold storage apparatus having my present improvements applied thereto. L is a coil-boiler for generating steam to heat the solution in the ammonia boiler A, with which the said coil-boiler is connected through the medium of a separator M, substantially as described in the said former specification. N is the room or chamber to be cooled. In the upper part of this chamber is arranged the tank H containing the non-congealable liquid in which the refrigerator tubes D are immersed. The bottom of this tank is made with corrugations or V-shaped portions $H^2$, and gutters or channels K are arranged beneath the said V-shaped portions for the purpose above described with reference to the tank H' shown in Fig. 10. By means of the aforesaid cocks or valves, the apparatus can be so adjusted as to very effectually control the temperature of the room or chamber to be cooled.

I wish it understood that I do not claim in this application for Letters Patent the well-known process of producing cold, in which the absorption of the gas from the refrigerating chambers is carried on simultaneously with the supply of anhydrous liquid ammonia to the said chambers, the impoverished solution from the boiler being fed into the aborber and the strong ammoniacal liquor overflowing from the absorber to the boiler. My process differs from this well-known process, inasmuch as the absorber is first charged with the impoverished solution, then the gas from the refrigerator is absorbed thereby, and then the absorber is emptied into the boiler, these operations being repeated as often as may be required, and, when two absorbers are used, being carried on alternately therein as above described. By this means I am enabled to retain a store of liquid ammonia in the refrigerator while keeping the apparatus ready for the production of cold or for the distillation of further quantities of ammonia.

I am aware, moreover, that an arrangement has been devised in which an auxiliary cooler is connected with the ammonia boiler or still for the purpose of receiving some of the liquor from the boiler, cooling such liquor while the boiler is being cooled and then returning the cooled liquor to the boiler, and the said cooler is not intended to be used as an absorber; I therefore make no claim to such an auxiliary cooler when not used as an absorber.

What I claim is—

1. In an apparatus for the production of cold by the intermittent ammonia absorption process, the combination with a boiler or still, a condenser or liquefier connected therewith, and refrigerating tubes or chambers connected with such condenser or liquefier and adapted to contain and store the liquid anhydrous ammonia, of an intermittently operating absorber and connecting-pipes provided with controlling valves or cocks, substantially as described, whereby first the still is put in communication with the absorber to charge the same with weak liquor, then communication between the still and the absorber is shut off and the refrigerator is put in communication with the absorber below the level of the liquor therein, and then the absorber is shut off from the refrigerator and again put in communication with the still, as and for the purposes set forth.

2. In an apparatus for the production of cold by the intermittent ammonia absorption process, the combination with a boiler or still, a condenser or liquefier connected therewith, a rectifier connected with the said still and condenser, and refrigerating tubes or chambers connected with the said condenser and adapted to contain and store the liquid anhydrous ammonia, of an intermittently operating absorber and connecting-pipes provided with controlling valves or cocks, whereby, after the ammonia is distilled and collected in the refrigerator, the still is put in communication with the said absorber to charge the same with weak liquor, then communication is opened first between the absorber and condenser to reduce the pressure therein and in the rectifier and still, then between the absorber and the refrigerator, and then between the absorber and the still, substantially as and for the purposes set forth.

FREDERICK BARKER HILL.

Witnesses:
DAVID YOUNG,
JOHN T. KNOWLES,
*Both of 11 and 12 Southampton Buildings, London, W. C.*